US009709744B2

(12) United States Patent
Song et al.

(10) Patent No.: US 9,709,744 B2
(45) Date of Patent: Jul. 18, 2017

(54) ANNULAR OPTICAL SHIFTER AND METHOD FOR SHIFTING OPTICAL SIGNAL

(71) Applicant: Huawei Technologies Co., Ltd., Shenzhen (CN)

(72) Inventors: Liang Song, Hangzhou (CN); Yingchun Yang, Hangzhou (CN); Yaoda Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/199,702

(22) Filed: Jun. 30, 2016

(65) Prior Publication Data

US 2016/0313508 A1    Oct. 27, 2016

Related U.S. Application Data

(63) Continuation of application No. PCT/CN2014/071910, filed on Feb. 10, 2014.

(30) Foreign Application Priority Data

Dec. 31, 2013 (WO) ................ PCT/CN2013/091148

(51) Int. Cl.
    *G02B 6/28* (2006.01)
    *G02B 6/35* (2006.01)
    (Continued)

(52) U.S. Cl.
    CPC ......... *G02B 6/2861* (2013.01); *G02B 6/3536* (2013.01); *G02B 6/3586* (2013.01);
    (Continued)

(58) Field of Classification Search
    CPC .. G02B 6/2861; G02B 6/3536; G02B 6/3586; G02F 1/3133; G02F 1/21; G02F 1/3136; G02F 2201/20
    See application file for complete search history.

(56) References Cited

U.S. PATENT DOCUMENTS

| 5,926,589 A * | 7/1999 | Gaeta ..................... G02B 6/122 |
| | | 385/15 |
| 6,559,989 B1 | 5/2003 | Kim et al. |
| | | (Continued) |

FOREIGN PATENT DOCUMENTS

| CN | 1414728 A | 4/2003 |
| CN | 101127570 A | 2/2008 |
| | (Continued) | |

OTHER PUBLICATIONS

Ashry et al., "All-Optical Variable Delay Buffer for Next Generation Optical Networks," 12th International Conference on Transparent Optical Networks, pp. 1-3, Institute of Electronics and Electrical Engineers, New York, New York (Jun. 27-Jul. 1, 2010).

(Continued)

*Primary Examiner* — John M Bedtelyon
(74) *Attorney, Agent, or Firm* — Leydig, Voit & Mayer, Ltd.

(57) ABSTRACT

An annular optical shifter and a method for controlling shift, where the annular optical shifter includes: a first bent straight-through waveguide, connecting an input end and an output end of an optical signal, and configured to transmit, to the output end, the optical signal input from the input end; multiple optical delay waveguide loops, arranged transversely and parallel on two arms of the first bent straight-through waveguide, where the multiple optical delay waveguide loops are configured to temporarily store optical signals; multiple pairs of optical switches, where each pair of optical switches are configured to control on and off of an optical path that is on the two arms of the first bent straight-through waveguide and two sides of an optical delay waveguide loop corresponding to each pair of optical switches; and a controller, configured to implement shift-up or shift-down of the optical signals.

3 Claims, 4 Drawing Sheets

(51) Int. Cl.
*G02F 1/21* (2006.01)
*G02F 1/313* (2006.01)

(52) U.S. Cl.
CPC ............. *G02F 1/21* (2013.01); *G02F 1/3133* (2013.01); *G02F 1/3136* (2013.01); *G02F 2201/20* (2013.01)

(56) References Cited

U.S. PATENT DOCUMENTS

| | | | |
|---|---|---|---|
| 6,917,739 B2* | 7/2005 | Chen | H04Q 11/0005 359/108 |
| 8,081,852 B2 | 12/2011 | Tobing et al. | |
| 2005/0286830 A1* | 12/2005 | Cutolo | G02B 6/26 385/27 |
| 2007/0071449 A1 | 3/2007 | Kang | |
| 2012/0293856 A1 | 11/2012 | Onaka | |
| 2013/0236137 A1 | 9/2013 | Meister et al. | |

FOREIGN PATENT DOCUMENTS

| | | |
|---|---|---|
| CN | 101258699 A | 9/2008 |
| CN | 101546086 A | 9/2009 |
| CN | 101610435 A | 12/2009 |
| CN | 101621718 A | 1/2010 |
| CN | 101834699 A | 9/2010 |
| CN | 101881859 A | 11/2010 |
| CN | 102111692 A | 6/2011 |
| CN | 102156507 A | 8/2011 |
| CN | 102629067 A | 8/2012 |
| CN | 102638311 A | 8/2012 |
| CN | 103091784 A | 5/2013 |
| EP | 1462833 A2 | 9/2004 |
| JP | H11352527 A | 12/1999 |
| JP | 4431704 B2 | 2/2006 |
| JP | 2008211530 A | 9/2008 |
| JP | 2009162933 A | 7/2009 |
| WO | WO 02103449 A1 | 12/2002 |
| WO | WO 2005025112 A2 | 3/2005 |
| WO | WO 2005103782 A1 | 11/2005 |

OTHER PUBLICATIONS

Office Action and Extended European Search Report in cognate European Patent Application No. 14875986.3 (Nov. 7, 2016).

Xia et al., "Ultracompact optical buffers on a silicon chip," Nature Photonics, vol. 1, pp. 65-71, Nature Publishing Group, London, United Kingdom (Jan. 2007).

* cited by examiner

… (1)

ANNULAR OPTICAL SHIFTER AND METHOD FOR SHIFTING OPTICAL SIGNAL

CROSS-REFERENCE TO RELATED APPLICATIONS

This application is a continuation of International Application No. PCT/CN2014/071910, filed on Feb. 10, 2014, which claims priority to International Patent Application No. PCT/CN2013/091148, filed on Dec. 31, 2013, both of which are hereby incorporated by reference in their entireties.

TECHNICAL FIELD

The present disclosure relates to the field of silicon photonics technologies, and in particular, to an annular optical shifter and a method for shifting an optical signal.

BACKGROUND

Compared with electrical interconnection technologies using copper wires as media, optical interconnection technologies using fibers or waveguides as transmission media have significant advantages in a transmission rate, a wideband density, power consumption, costs, and other aspects, become a research focus in recent years, and are developed rapidly.

How to implement shift of an optical signal to temporarily store the optical signal is still a technical difficulty at present.

SUMMARY

Based on this, embodiments of the present disclosure provide an annular optical shifter and a method for shifting an optical signal, which can implement shift of an optical signal.

According to a first aspect, an annular optical shifter is provided, where the optical shifter includes:

a first bent straight-through waveguide, n-shaped, connecting an input end and an output end of an optical signal, functioning as a transmission bus of the optical signal, and configured to transmit to the output end, the optical signal input from the input end;

multiple optical delay waveguide loops, each of which is arranged transversely and parallel on two arms of the first bent straight-through waveguide, where on and off of an optical path that is on two sides of each optical delay waveguide loop and the two arms of the first bent straight-through waveguide are implemented by using a pair of optical switches, and the multiple optical delay waveguide loops are configured to temporarily store the optical signal;

multiple pairs of optical switches, whose quantity is the same as that of the multiple optical delay waveguide loops, where each pair of optical switches are configured to control the on and off of the optical path that is on the two arms of the first bent straight-through waveguide and the two sides of the optical delay waveguide loop corresponding to each pair of optical switches; and a controller, connected to each optical switch of the multiple pairs of optical switches by using a control signal line, and configured to receive an optical signal shift instruction sent by an external device, generate control signals according to the shift instruction, send the control signal to optical switches on a specific side that are connected to a specific arm of the n-shaped first bent straight-through waveguide, and control on-off statuses of the optical switches on the specific side, so that the optical signals stored in the multiple optical delay waveguide loops are shifted up or down.

In a first implementation manner of the first aspect, the foregoing controller includes:

a shift instruction receiving unit, configured to receive the optical signal shift instruction sent by the external device;

an instruction parsing unit, configured to parse the optical signal shift instruction, and extract a shift direction identifier and shift bits information from the optical signal shift instruction;

a control signal generation unit, configured to search for a mapping relationship between a shift direction and a controlled optical switch according to the shift direction identifier, determine an identifier of the controlled optical switch, calculate a time interval of an on-off status conversion of the optical switch according to the shift bits information, and generate the control signals according to the identifier of the controlled optical switch and the time interval; and a control signal sending unit, configured to send an "on" control signal to the optical switch corresponding to the identifier of the controlled optical switch, and after the time interval, send an "off" control signal to the optical switch corresponding to the identifier of the controlled optical switch; and a storage unit, configured to store the mapping relationship between the shifting direction and the controlled optical switch.

According to a second aspect, a shift control method for an annular optical shifter is provided, where the method includes:

receiving an optical signal shift instruction sent by an external device;

parsing the optical signal shift instruction, and extracting a shift direction identifier and shift bits information from the optical signal shift instruction;

searching for a mapping relationship between a shift direction and a controlled optical switch according to the shift direction identifier, determining an identifier of the controlled optical switch, calculating a time interval of on-off status conversion of the optical switch according to the shift bits information, and generating control signals according to the identifier of the controlled optical switch and the time interval; and sending an "on" control signal to the optical switch corresponding to the identifier of the controlled optical switch, and after the time interval, sending an "off" control signal to the optical switch corresponding to the identifier of the controlled optical switch.

Based on the foregoing technical solutions, embodiments of the present disclosure provide an annular optical shifter and a method for shifting an optical signal.

BRIEF DESCRIPTION OF DRAWINGS

The following briefly describes the accompanying drawings required for describing the embodiments of the present disclosure.

DESCRIPTION OF EMBODIMENTS

The following describes the technical solutions in the embodiments of the present disclosure with reference to the accompanying drawings in the embodiments of the present disclosure.

Figure 1:
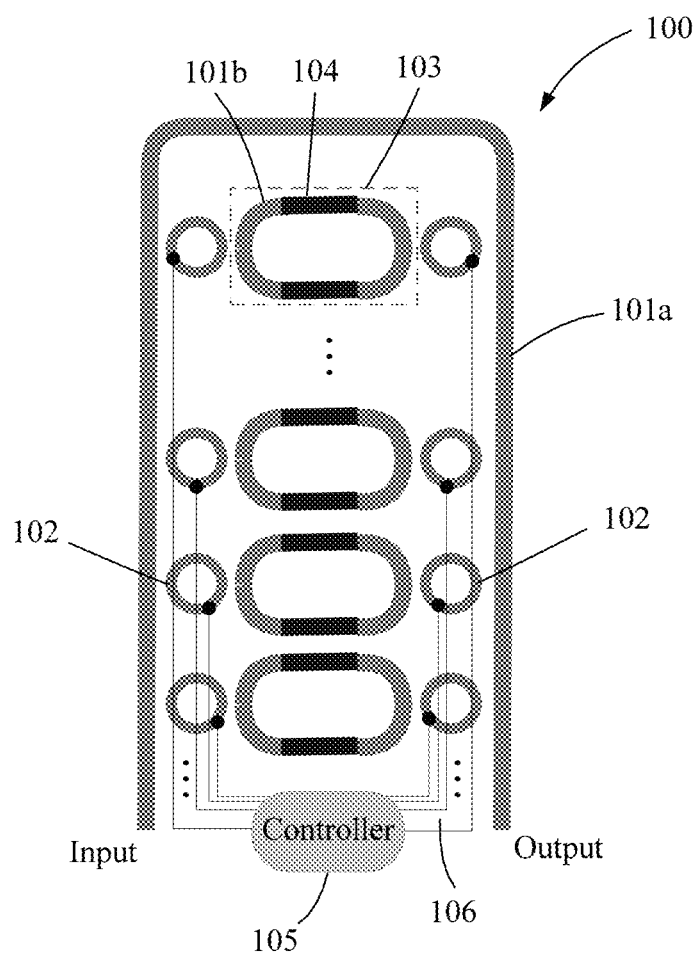
FIG. 1 is a schematic structural composition diagram of an annular optical shifter according to an embodiment of the present disclosure.
Figure 2:
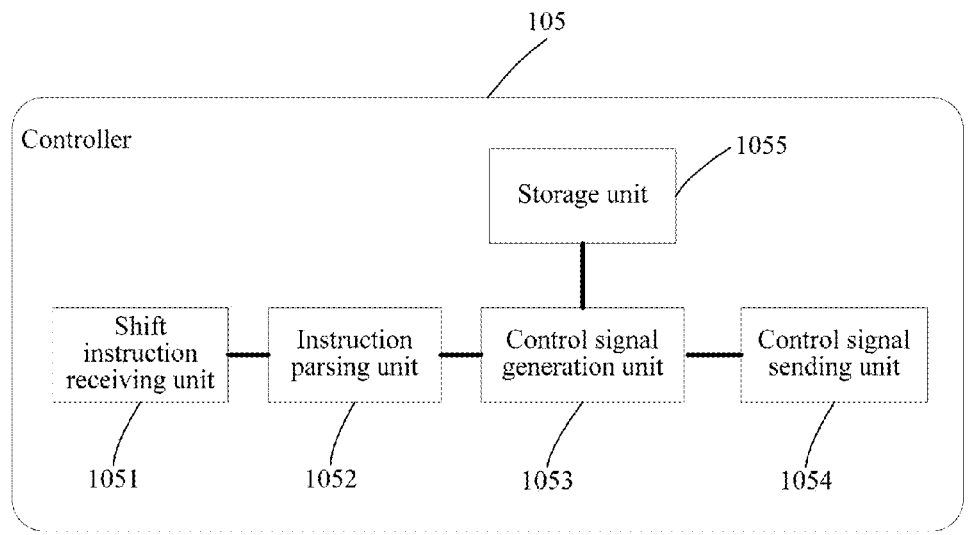
FIG. 2 is a schematic structural composition diagram of a controller of the annular optical shifter according to an embodiment of the present disclosure.

An embodiment of the present disclosure provides an annular optical shifter. Referring to FIG. 1, the annular optical shifter 100 includes:

a first bent straight-through waveguide 101a, n-shaped, connecting an input end and an output end of an optical signal, functioning as a transmission bus of the optical signal, and configured to transmit, to the output end, the optical signal input from the input end;

multiple optical delay waveguide loops 103, arranged transversely and parallel on two arms of the first bent straight-through waveguide 101a, where on and off of an optical path that is on two sides of each optical delay waveguide loop 103 and the two arms of the first bent straight-through waveguide 101a are implemented by using a pair of optical switches 102, and the foregoing multiple optical delay waveguide loops 103 are configured to temporarily store optical signals;

multiple pairs of optical switches 102, whose quantity is the same as that of the foregoing multiple optical delay waveguide loops 103, where each pair of optical switches 102 are configured to control the on and off of the optical path that is on the two arms of the first bent straight-through waveguide 101a and the two sides of the optical delay waveguide loop 103 corresponding to each pair of optical switches 102; and a controller 105, connected to each optical switch of the multiple pairs of optical switches 102 by using a control signal line 106, and configured to receive an optical signal shift instruction sent by an external device, generate control signals according to the shift instruction, send the control signal to all optical switches 102 that are connected to a specific arm of the n-shaped first bent straight-through waveguide 101a and that are on a specific side, and control on-off statuses of the optical switches 102 on the specific side, so that the optical signals stored in the multiple optical delay waveguide loops 103 are shifted up or down.

The foregoing external device may be a Central Processing Unit (CPU) of an optical signal processing system, or an optical switch in an optical switching network, or the like, which is not limited in this embodiment of the present disclosure.

A transmission rate of the optical signal in the optical delay waveguide loop 103 can be slowed by using a slow light effect waveguide 104, so that the optical signal is temporarily stored in the optical delay waveguide loop 103.

It should be noted that there are multiple pairs of optical switches and multiple optical delay waveguide loops respectively connected to the multiple pairs of optical switches in FIG. 1, and for clarity of identifiers of the accompanying drawing, only one pair of optical switches in the middle and an optical delay waveguide loop are marked with reference signs in FIG. 1. It can be understood by a person skilled in the art that the foregoing reference signs also represent each other pair of optical switches and each other optical delay waveguide loop.

Furthermore, the foregoing controller 105 includes:

a shift instruction receiving unit 1051, configured to receive the optical signal shift instruction sent by the external device;

an instruction parsing unit 1052, configured to parse the foregoing optical signal shift instruction, and extract a shift direction identifier and shift bits information from the optical signal shift instruction;

a control signal generation unit 1053, configured to search for a mapping relationship between a shift direction and a controlled optical switch according to the shift direction identifier, determine an identifier of the controlled optical switch, calculated time interval of on-off status of the optical switch according to the shift bits information, and generate the control signals according to the identifier of the controlled optical switch and the time interval;

a control signal sending unit 1054, configured to send an "on" control signal to the optical switch corresponding to the identifier of the controlled optical switch, and after the time interval of the on-off status, send an "off" control signal to the optical switch corresponding to the identifier of the controlled optical switch; and a storage unit 1055, configured to store the mapping relationship between the shift direction and the controlled optical switch.

Figure 3:
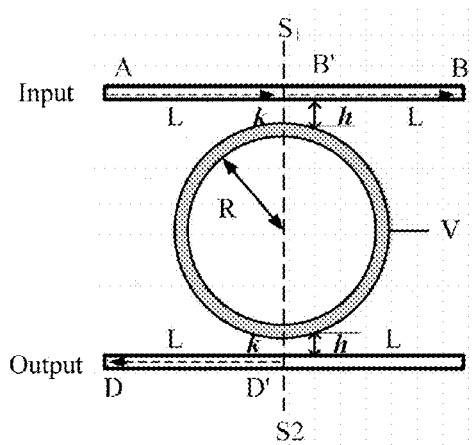
FIG. 3 is a schematic structural composition diagram of a micro-ring electro-optic switch according to an embodiment of the present disclosure.
Figure 3:
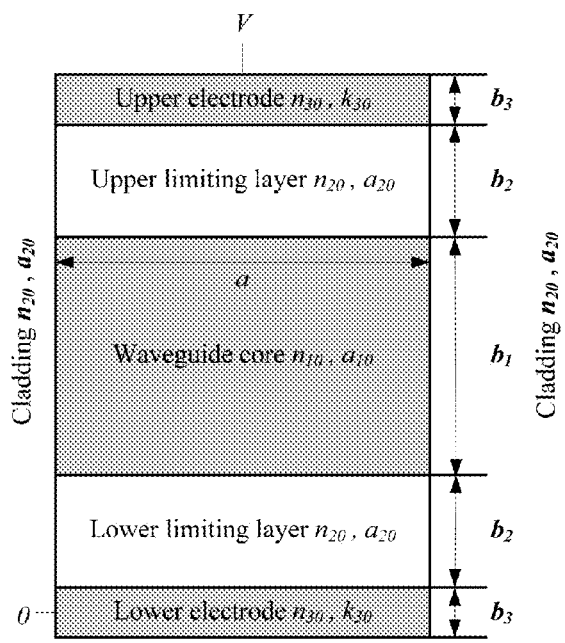

A structure of a micro-ring electro-optic switch in the foregoing annular optical shifter is shown in a left figure of FIG. 3, and the micro-ring electro-optic switch includes two channel waveguides and a micro-ring waveguide. A structure of the micro-ring waveguide is shown in a right figure of FIG. 3, and sequentially includes an upper electrode, an upper limiting layer, a waveguide core, a lower limiting layer, a lower electrode, and a substrate, where the waveguide core is made of a polymer or a silicon optoelectronic material. A radius of the micro-ring waveguide is R. Lengths of the two channels waveguide are equal, and are both 2 L, where L is a distance between a channel port and a coupling point. A coupling distance between the micro-ring waveguide and the channel waveguide is h. A width of a core of the micro-ring is a; and a thickness of the core is $b_1$, a refractive index is $n_{10}$, and a body amplitude attenuation coefficient is $a_{10}$. A thickness of each of the upper and lower electrodes is $b_3$, a refractive index is $n_{30}$, and a body extinction coefficient is $k_{30}$. A refractive index of left and right claddings on two sides of the core is $n_{40}$, and a body amplitude attenuation coefficient is $a_{40}$. No surface electrode is added to the channel waveguide. To enable the channel and the micro-ring to have same propagation constants, core widths of the two slightly differ from each other, which is caused by bending of the micro-ring. In addition, all other parameters of the channel waveguide are the same as those of the micro-ring waveguide. An amplitude coupling ratio of the micro-ring to the channel is k, and an amplitude refractive ratio of the micro-ring to the channel is t, where $k^2+t^2=1$.

For the structure of the micro-ring electro-optic switch in the left figure of FIG. 3, this structure is a micro-ring resonant filter when no voltage is applied, and is the micro-ring electro-optic switch when a voltage is applied. A working principle of the micro-ring electro-optic switch is: an optical signal having a resonant wavelength is selected and is input from a left port A of an upper channel. When an applied voltage is zero, a left port D of a lower channel has a maximum output optical power, and a right port B of the upper channel has a minimum output optical power. When a voltage is applied to the electrode of the micro-ring, a refractive index of the polymer or silicon material at a core layer of the micro-ring changes, so that a propagation constant of a mode in the micro-ring changes, and phase mismatch between the micro-ring and the channel occurs, thereby causing a change in an optical power of a signal transmitted in the micro-ring and in the channel. When the applied voltage is equal to an on-off conversion voltage, the output optical power of the left port D of the lower channel becomes minimum, and the output optical power of the right port B of the upper channel becomes maximum, thereby implementing an on-off function.

According to the foregoing working principle of the micro-ring electro-optic switch, an optical shift principle is described by using FIG. 1 as an example. 102 in FIG. 1 is the micro-ring electro-optic switch. By using an on-off characteristic of the micro-ring electro-optic switch, an optical signal in the first bent straight-through waveguide 101a flows into the optical delay waveguide loop 103 through the micro-ring electro-optic switch, and an optical signal in the optical delay waveguide loop 103 flows into the first bent straight-through waveguide 101a through the micro-ring electro-optic switch.

It can be understood by a person skilled in the art that the foregoing optical switch 102 is described by using a micro-ring electro-optic switch, or an Mach-Zehnder Interferometer (MZI) electro-optic switch. Both implementation of the micro-ring electro-optic switch and implementation of the MZI electro-optic switch fall within the prior art, and are not described in detail in this embodiment of the present disclosure.

Figure 4A:
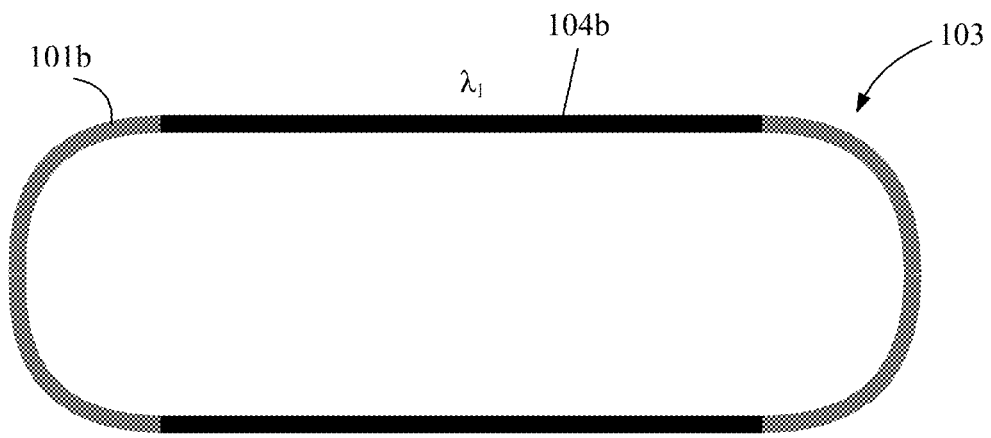
FIG. 4A is a schematic structural diagram of a first embodiment of an optical delay waveguide loop according to an embodiment of an annular optical buffer of the present disclosure.

Optionally, referring to FIG. 4A, each optical delay waveguide loop 103 in the foregoing annular optical shifter may include a slow light effect waveguide 104b and a bent waveguide 101b, where the slow light effect waveguide 104b is configured to slow a transmission rate of an optical signal in the optical delay waveguide loop 103, to implement storage of an optical signal of a larger capacity in the optical delay waveguide loop 103. The foregoing slow light effect waveguide 104b may be implemented by using a photonic crystal waveguide (PCW), electromagnetically induced transparency (EIT), coherent population oscillation (CPO), stimulated Brillouin scattering (SBS), or another method. The bent waveguide 101b may be implemented by using a silicon waveguide or another waveguide, which is not limited in this embodiment of the present disclosure.

Figure 4B:
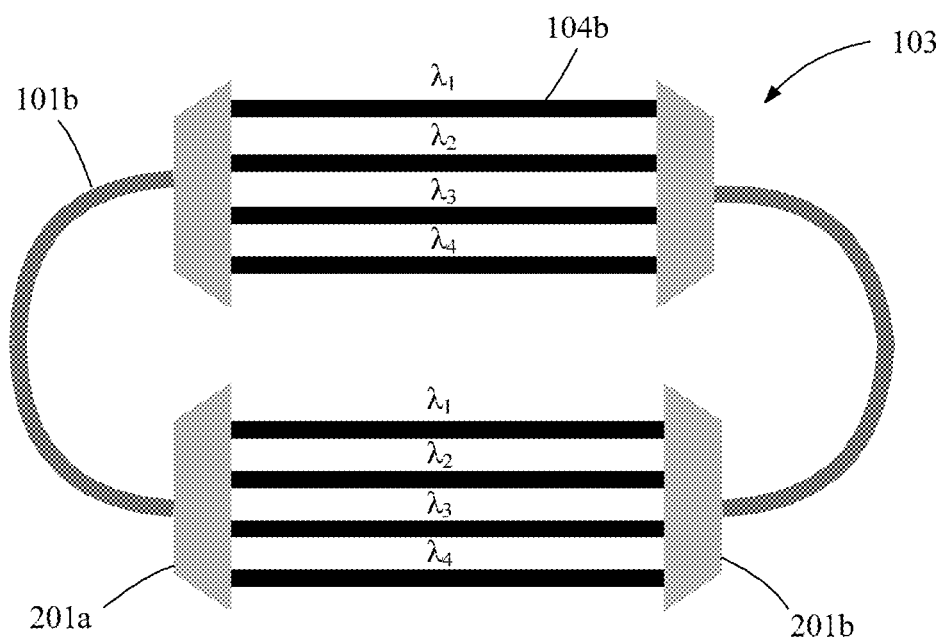
FIG. 4B is a schematic structural diagram of a second embodiment of an optical delay waveguide loop according to an embodiment of an annular optical buffer of the present disclosure.
Figure 5:
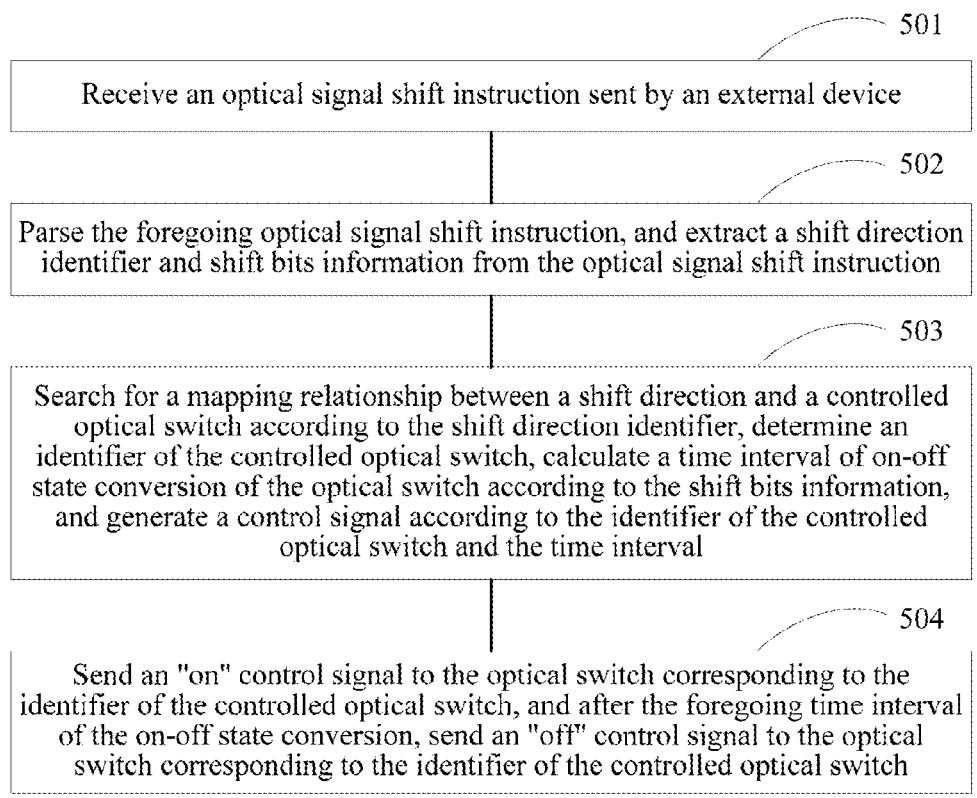
FIG. 5 is a schematic flowchart of controlling shift by using an annular optical shifter according to an embodiment of the present disclosure.

Optionally, the optical delay waveguide loop 103 may be a photonic crystal waveguide loop corresponding to a single wavelength, as shown in FIG. 4A, or may be a photonic crystal waveguide loop corresponding to wavelength division multiplexing (WDM), that is, multiple photonic crystal waveguide loops respectively correspond to multiple wavelengths, as shown in FIG. 4B. In FIG. 4A, the photonic crystal waveguide 104b plays a role of slowing an optical transmission rate of only an optical signal with a wavelength of $\lambda_1$ (that is, a slow light effect). In FIG. 4B, there are four photonic crystal waveguides, which respectively produce a slow light effect on optical signals with wavelengths of $\lambda_1$, $\lambda_2$, $\lambda_3$, and $\lambda_4$. For a wavelength division multiplexing optical signal including M wavelengths (where M is an integer and M>1), first, the wavelength division multiplexing optical signal including M wavelengths needs to be de-multiplexed into M single-wavelength optical signals with different wavelengths by using a wavelength division de-multiplexer 201a; then, the foregoing M single-wavelength optical signals with different wavelengths pass through M single-wavelength optical delay waveguide loops, and optical signal delay is separately performed on the M single-wavelength optical signals with different wavelengths; and then wavelength division multiplexing is performed, by using a wavelength division multiplexer 201b, on the delayed M single-wavelength optical signals with different wavelengths to obtain a wavelength division multiplexing optical signal.

In addition, another embodiment of the present disclosure provides a shift control method for an annular optical shifter, where the method includes:

501: Receive an optical signal shift instruction sent by an external device.

The optical signal shift instruction is sent by the external device, and the external device may be a Central Processing Unit (CPU) of an optical signal processing system, or an optical switch in an optical switching network, or the like, which is not limited in this embodiment of the present disclosure.

502: Parse the foregoing optical signal shift instruction, and extract a shift direction identifier and shift bits information from the optical signal shift instruction.

The foregoing optical signal shift instruction includes: the shift direction identifier and the shift bits information. The shift direction identifier and the shift bits information are extracted from the shift instruction by parsing the foregoing shift instruction, where the shift direction identifier includes: up or down, and the shift bits information includes: a quantity of optical delay waveguide loops through which the optical signal is shifted to pass. Herein, it should be noted that assuming that a length of an optical signal stored in an optical delay waveguide loop is one bit, the shift bits information indicates a quantity of optical delay waveguide loops through which the optical signal is shifted to pass.

503: Search for a mapping relationship between a shift direction and a controlled optical switch according to the shift direction identifier, determine an identifier of the controlled optical switch, calculate a time interval of on-off status conversion of the optical switch according to the shift bits information, and generate control signals according to the identifier of the controlled optical switch and the time interval.

In a specific implementation process, the mapping relationship between the shift direction and the controlled optical switch may be implemented by using a table, which is, for example, shown in the following table:

TABLE 1

Mapping table of a shift direction and a controlled optical switch

| Shift direction | Controlled optical switch |
| --- | --- |
| Up (UP) | Optical switch on a left side |
| Down (DOWN) | Optical switch on a right side |

According to the shift direction identifier in the shift instruction, the controlled optical switch is obtained by searching Table 1.

The time interval of on-off status conversion of the optical switch is obtained through calculation according to the shift bits information.

For example, referring to FIG. 1, assuming that the shift direction identifier in the shift instruction received by the controller 105 of the optical shifter is up, and the shift bits information is 2 bits, the controller 105 searches a mapping table of the shift direction and the controlled optical switch, determines that the controlled optical switch is an optical switch on a left side of the n-shaped optical shifter, and calculates the time interval of the on-off status conversion of the controlled optical switch according to the shift bits information being 2 bits.

Assuming that the controller 105 takes 40 ns to process a reading process (including processing of receiving the instruction sent by the external device, parsing the instruction, and generating and sending optical switch control signals), and an on-off time of the optical switch 102 is 2 ns, when the optical switch 102 is in an on state (where a sum of a processing time of the controller 105 and the on-off conversion time of the optical switch is 42 ns), a time that the optical signal passes through an optical switch and is completely shifted into another optical delay waveguide loop is negligible, and in this way, the optical signal takes a time of 42 ns to be shifted by 1 bit. When the shift bits information received by the controller is n (n≥2) bits, because the optical signal needs to pass through (n−1) loops, and a transmission time of the optical signal in the loops is 3 ns, a time of 42+3*(n−1) (ns) needs to be taken. In the foregoing example, the shift instruction is to shift up by 2 bits, and therefore, a time of 42+3=45 ns is taken, that is, after 45 ns, the controller sends an "off" control signal to all switches on the left side of the annular optical shifter.

504: Send an "on" control signal to the optical switch corresponding to the identifier of the controlled optical switch, and after the foregoing time interval of the on-off status conversion, send an "off" control signal to the optical switch corresponding to the identifier of the controlled optical switch.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An annular optical shifter, comprising:
   a first bent straight-through n-shaped waveguide with an input end and an output end, the waveguide configured to transmit an optical signal from the input end to the output end thereby functioning as a transmission bus of the optical signal;
   multiple optical delay waveguide loops, each waveguide loop arranged in a direction parallel to two arms of the first bent straight-through waveguide and located within a spacing between the two arms, wherein the multiple optical delay waveguide loops are configured to temporarily store the optical signal;
   multiple pairs of optical switches, each pair corresponding to a waveguide loop in the multiple optical delay waveguide loops and containing two switches each located on either side of the waveguide loop in spacing between the optical delay waveguide loop and an arm of the first bent straight-through waveguide, wherein each pair of optical switches is configured to control an on and off of an optical path that is on the two arms of the first bent straight-through waveguide and two sides of the optical delay waveguide loop corresponding to each pair of optical switches; and a controller, connected to each optical switch of the multiple pairs of optical switches through a control signal line, the controller configured to (a) receive an optical signal shift instruction sent by an external device, (b) generate control signals according to the shift instruction, (c) send the control signal to optical switches on a specific side that are connected to a specific arm of the first bent straight-through waveguide, and (d) control on-off statuses of the optical switches on the specific side to make the optical signal stored in the multiple optical delay waveguide loops shifts up or down.

2. The annular optical shifter according to claim 1, wherein the controller comprises one or more processors and a memory, the memory storing one or more fixed sequences of instructions, such that executing the one or more fixed sequences of instructions by the one or more processors causes the one or more processors to perform the steps of:

receiving the optical signal shift instruction sent by the external device;

parsing the optical signal shift instruction, and extract a shift direction identifier and shift bits information from the optical signal shift instruction;

searching for a mapping relationship between a shift direction and a controlled optical switch according to the shift direction identifier, determining an identifier of the controlled optical switch, calculating a time interval of an on-off conversion status of the optical switch according to the shift bits information, and generating the control signals according to the identifier of the controlled optical switch and the time interval;

sending an "on" control signal to the optical switch corresponding to the identifier of the controlled optical switch, and after the time interval of the on-off conversion status, sending an "off" control signal to the optical switch corresponding to the identifier of the controlled optical switch.

3. A shift control method for an annular optical shifter, the method comprising:

receiving an optical signal shift instruction sent by an external device;

parsing the optical signal shift instruction, and extracting a shift direction identifier and shift bits information from the optical signal shift instruction;

searching for a mapping relationship between a shift direction and a controlled optical switch according to the shift direction identifier, determining an identifier of the controlled optical switch, calculating a time interval of on-off status conversion of the optical switch according to the shift bits information, and generating control signals according to the identifier of the controlled optical switch and the time interval; and sending an "on" control signal to the optical switch corresponding to the identifier of the controlled optical switch, and after the time interval of on-off status conversion, sending an "off" control signal to the optical switch corresponding to the identifier of the controlled optical switch.

* * * * *